United States Patent [19]

Radcliffe

[11] Patent Number: 4,642,743

[45] Date of Patent: Feb. 10, 1987

[54] POWER SUPPLIES WITH MAGNETIC AMPLIFIER VOLTAGE REGULATION

[75] Inventor: Jerry K. Radcliffe, Owego, N.Y.

[73] Assignee: International Business Machines Corp., Armonk, N.Y.

[21] Appl. No.: 762,648

[22] Filed: Aug. 5, 1985

[51] Int. Cl.⁴ .......................................... H02M 3/335
[52] U.S. Cl. ...................................... 363/21; 363/56; 363/97
[58] Field of Search .................. 363/21, 55, 56, 80, 363/97

[56] References Cited

U.S. PATENT DOCUMENTS

| | | | |
|---|---|---|---|
| 2,054,496 | 9/1936 | Craig | 323/329 |
| 2,638,571 | 5/1953 | Schultz | 323/301 |
| 2,753,513 | 7/1956 | Sola | 323/307 |
| 3,182,249 | 5/1965 | Pahlavan | 323/339 |
| 4,447,866 | 5/1984 | Reeves | 363/21 |

Primary Examiner—William H. Beha, Jr.
Assistant Examiner—Anita M. Ault
Attorney, Agent, or Firm—Milton M. Field

[57] ABSTRACT

A power supply including a saturable reactor voltage regulator using a core formed of relatively inexpensive magnetically soft material with a B-H loop which is poor in squareness. The reset point of the saturable reactor core is established by a clamping circuit, including a transistor switch and diode in series, which effectively clamps a short circuit across the reactor winding when the core reaches a desired reset point on its B-H loop. The proper time of actuation of the clamping circuit is selected by a control circuit which includes a comparator for generating a control signal for actuating the switch whenever an error voltage derived from the output voltage exceeds the voltage level of a triangular wave developed by integrating a replica of the input pulsations to the magnetic amplifier structure. The saturable reactor is driven to saturation at a time during positive pulsations related to the position of the reset point.

In one embodiment, the clamping circuit is connected directly across the reactor winding, while in a second embodiment, the clamping circuit is connected across a secondary reactor winding. A bias winding for the reactor may be provided to shift the B-H loop of the core to the right to increase the range of adjustment.

18 Claims, 8 Drawing Figures

POWER SUPPLIES WITH MAGNETIC AMPLIFIER VOLTAGE REGULATION

BACKGROUND OF THE INVENTION

1. Field of the Invention

This invention relates to power supplies and, more particularly, to power supplies of the switching converter type using magnetic amplifier or saturable reactor voltage regulating means.

2. Brief Description of the Prior Art

Switching power supplies are frequently used to provide a plurality of separate outputs, and independent control of the outputs is often required. This has usually been done in the past by packaging multiple power stages in one unit and using a separate control loop for each output. A separate switching power stage and transformer are needed for each controlled output. This solution works well but is expensive.

Another solution, involving the use of a magnetic amplifier, which is described in the article "Switch Mode Converter Using High-Frequency Magnetic Amplifier" by Hiramatsu, Harada and Ninomiya appearing in *Power Conversion International* for March-April 1980 at pages 75-82, allows control on the secondary side of the transformer. Thus, one transformer delivers multiple, independently controlled, outputs with large cost and size savings.

As will be explained more fully below in connection with FIG. 1, prior art converters of this type use a switch transistor to drive the primary of a transformer which has two output windings. One of the output windings feeds a rectifier and filter to supply a first output voltage which is sensed by a control circuit which adjusts the operating duty cycle of the switch to maintain the output voltage at a preset value. The second output winding is connected to a rectifier and filter through a saturable reactor having a core with a square B-H loop. When the core is not saturated, the reactor exhibits a high impedance and prevents the voltage in the second output winding from reaching the rectifier and filter. The voltage will cause the core to saturate after a period of time determined by the starting point on the B-H loop and the applied voltage. When the core saturates, the reactor switches to a low impedance value permitting the voltage to be applied to the rectifier and filter. Between pulses, a control circuit forces the reactor to reset with a current which is poled in a direction opposite to the direction of the current during the active conduction period. The reset point is adjusted in response to the output voltage to maintain the output voltage at a preset value.

While this scheme works well, there are cost problems associated with the construction of the saturable reactor. A square loop material with a high degree of squareness is required. This is usually obtained by using metal tape-wound cores of permalloy which are expensive. Square loop ferrites may also be used, but the available ferrite materials are quite lossy, leading to heat problems. To maintain squareness, an ungapped magnetic structure, usually a toroidal core, is required. These are expensive to wind and difficult to mount.

It has been suggested in U.S. Pat. No. 2,753,518 that a magnetic amplifier voltage control system use relatively inexpensive substantially zero remanent, moderately low permeability cores with a B-H characteristic having poor squareness. In order to control the direct current power to a load, the reset point of the core is controlled by adjusting a current supplied during a control half-cycle in a control circuit including a variable resistance, a rectifier and a control winding for the saturable reactor.

It is also known from U.S. Pat. Nos. 2,054,496, 2,638,571 and 3,182,249 to control the current through a reactor by controlling the application of a short circuit across the reactor or across a winding coupled magnetically with the reactor.

SUMMARY OF THE INVENTION

It is the object of the present invention to address the problem of a costly saturable reactor and provide a power supply using a magnetic amplifier having a core formed of relatively inexpensive magnetically soft material with a B-H characteristic which is poor in squareness and having improved control circuitry for the operation of the magnetic amplifier to provide effective voltage regulation.

To this end, the present invention contemplates the provision of a power supply in which the reset point of the saturable core is established by providing clamping means, including a transistor switch and diode in series, effectively to clamp a short circuit across the reactor winding when the core reaches a desired reset point on its B-H loop. In order to select the proper time of actuation of the clamping means, a control circuit includes a comparator for generating a control signal for actuating the switch whenever an error voltage derived from the output voltage of the power supply and a reference voltage exceeds the voltage level of a triangular wave developed by integrating a replica of the input pulsations the magnetic amplifier structure.

The power supply of the invention includes a source of alternating positive and negative voltage pulsations, such as square pulses of the type typically provided by a switching inverter, which are applied through a transformer to a secondary winding. The saturable reactor winding, which is connected between the secondary winding and rectifier and filter means providing the direct current output voltage, is driven to saturation at a time during the positive pulsations related to the position of the reset point. By controlling the position of the reset point, the control circuit controls the duty cycle of the voltage applied to the rectifier means. Since the operation of the control circuit depends on the magnitude of the error voltage, the circuit operates to maintain the output voltage at a preset value.

In order to insure that the short circuit is applied only during negative pulsations when the core is being reset, the diode in series with the transistor switch is poled to block current during positive pulsations.

The control circuit includes an integrator and a baseline clipper diode which prevents the generated triangular wave from becoming negative. The error voltage is generated by an error circuit comprising a differential amplifier, the inputs of which receive the output voltage and a reference voltage.

The above-described technique for controlling voltage may be used in a switching converter having a plurality of secondary windings each feeding a rectifier-filter. The output of one of the rectifier filters may be controlled as described above, while another output may be used to control a pulse width modulator controlling the duty cycle of the switching transistor driving the transformer primary winding.

The clamping switch may be connected directly across the reactor winding or may be effectively connected across the reactor winding by being connected across a secondary reactor winding coupled to the reactor winding. A bias winding may also be provided to apply a bias signal for shifting the B-H characteristic of the core to the right to increase the range of adjustment.

BRIEF DESCRIPTION OF THE DRAWINGS

These and other objects, features and advantages of the invention will be more fully appreciated with reference of the accompanying figures, in which.

DETAILED DESCRIPTION OF THE PREFERRED EMBODIMENTS

Figure 1:
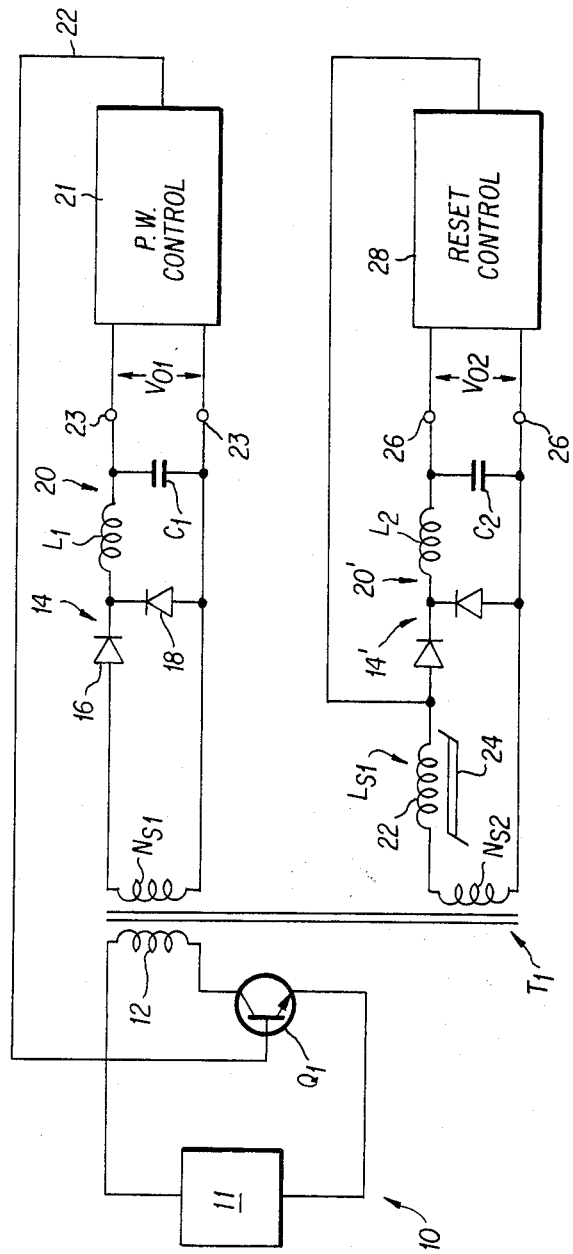
FIG. 1 is a schematic circuit diagram of a power converter of the prior art using a magnetic amplifier voltage regulator.

A prior art converter circuit is shown in FIG. 1. In this circuit a switching inverter 10 includes a direct current supply 11, which drives a primary winding 12 of power transformer $T_1$ through a transistor switch $Q_1$. The transformer has two secondary windings $N_{s1}$ and $N_{s2}$. The voltage appearing across winding $N_{s1}$ is rectified and filtered in the conventional manner. The rectifier 14, includes a series diode 16 and a shunt diode 18; and a low pass filter 20 includes a series inductor $L_1$ and a shunt capacitor $C_1$ to remove alternating current ripple components to provide a first output direct current voltage $V_{o1}$. A control circuit 21 is a conventional pulse width modulator error circuit providing a control pulse on output 22. The control pulse, the width of which is a function of the difference between the magnitude of output voltage $V_{o1}$ and a reference voltage, controls the switching of transistor switch $Q_1$ and thus adjusts the duty cycle of inverter 10. This adjustment maintains output voltage $V_{o1}$ at a preset value, voltage $V_{o1}$ being proportional to the duty cycle of inverter 10.

Figure 2:
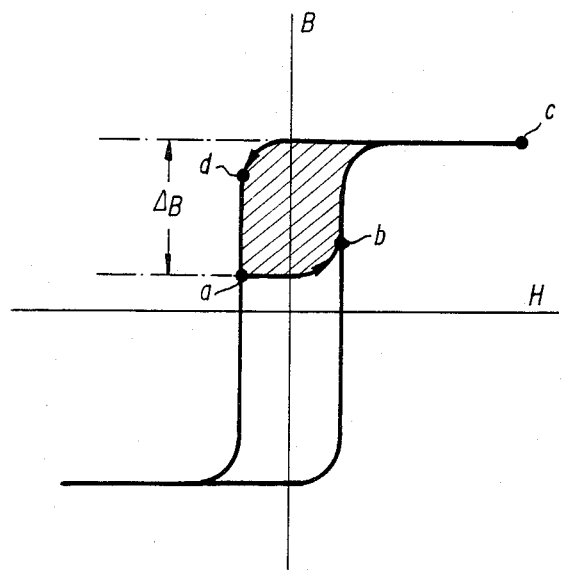
FIG. 2 is a hysteresis characteristic of the core member of the magnetic amplifier of the circuit of FIG. 1.

The second output winding $N_{s2}$ of transformer $T_1$ is connected to an identical rectifier 14' and low pass filter 20' through a saturable reactor $L_{s1}$ which comprises a reactor winding 22 and a saturable core 24 formed of a material, such as tape wound permalloy, and an ungapped toroidal structure providing a highly square characteristic. The square B-H hysteresis loop of core 24 is shown in FIG. 2 in which, in the usual manner, B represents magnetic flux density and H signifies magnetizing force. At the start of a pulse, the core is reset to a point a in the left hand plane, which consists of the upper left and lower left quadrants, of the characteristic. When transistor Q1 becomes conductive, a positive voltage appears across winding $N_{s2}$. At this time saturable reactor $L_{s1}$ is not saturated, and reactor winding 22 exhibits a high impedance preventing the voltage across winding $N_{s2}$ from being applied to rectifier 14' and filter 20'. The voltage applied to reactor $L_{s1}$ will cause core 24 to saturate after a period of time determined by the starting point a and the magnitude of the applied voltage. Core 24 will move along the hysteresis loop from point a to point b and then to point c in the upper right quadrant of the characteristic. The core will then be saturated, and the reactor will be switched to a low impedance value. The voltage across winding $N_{s2}$ will now be applied to rectifier 14' and low pass filter 20' supplying direct current output voltage $V_{o2}$ to output terminals 26. When transistor switch $Q_1$ turns off, the positive voltage on secondary winding $N_{s2}$ is removed; and core 24 returns to point d on its B-H loop. Between pulses, a reset control circuit 28 senses output voltage $V_{o2}$ and generates a control current which is a function of the difference between output voltage $V_{o2}$ and a reference voltage. The reset control current, which is opposite in polarity to the current through reactor winding 22 during the period of conduction of transistor switch $Q_1$, forces reactor core 24 to reset to point a of the characteristic so that the reactor will be ready for the next pulse. The controlled range of adjustment of the flux density is shown as $\Delta B$ in FIG. 2. Saturable reactor $L_{s1}$ acts to shrink the pulse from transistor $Q_1$ by an amount controlled by the location of the reset point a to maintain output voltage $V_{o2}$ at a preset value.

Although the prior art circuit of FIG. 1 is effective, it requires a saturable reactor core made of a square loop material having a high degree of squareness. Expensive metal tape-wound cores using permalloy or lossy square loop ferrites may be used, and ungapped toroidal structures which are expensive to wind and diffidult to mount are needed.

Figure 3:
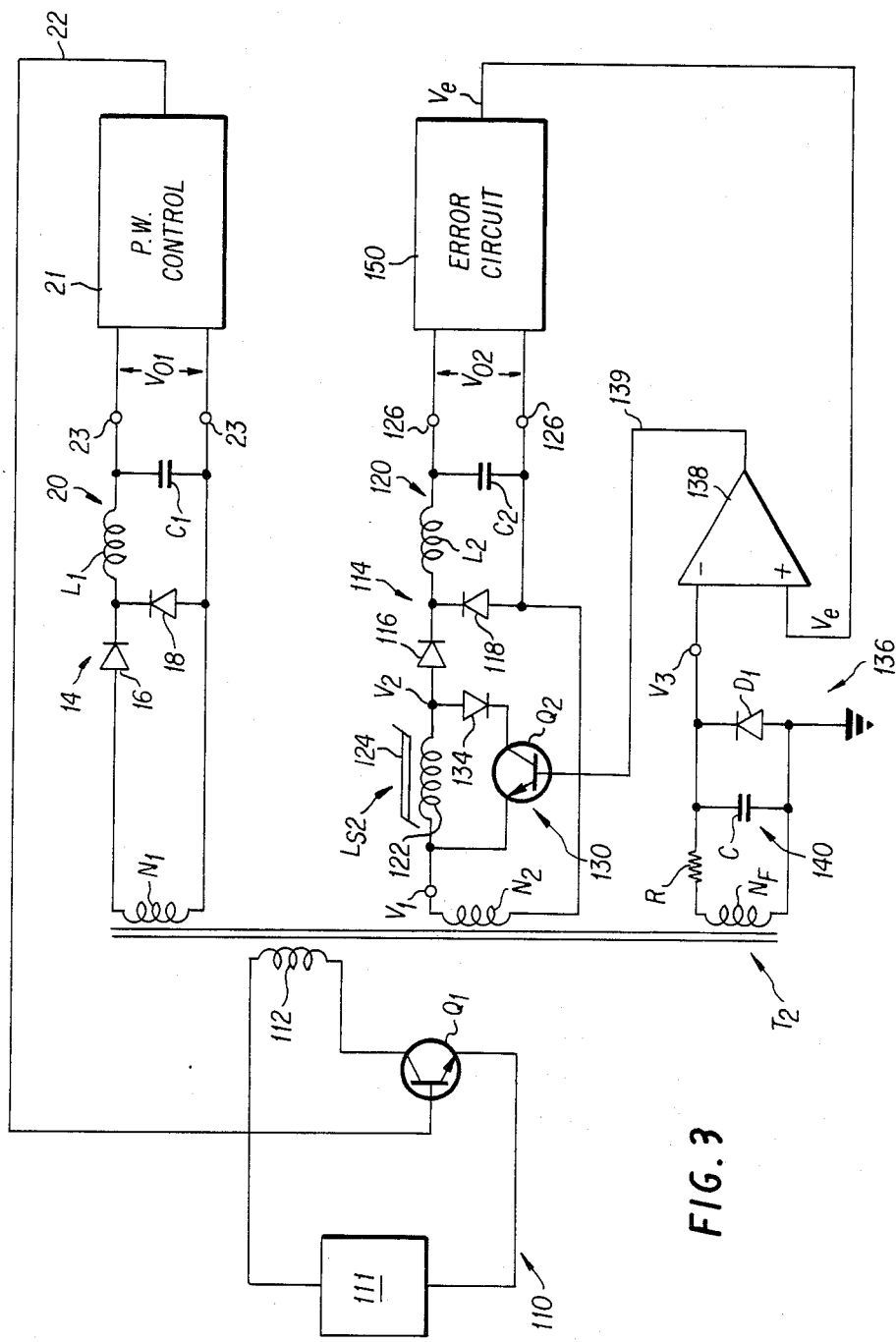
FIG. 3 is a schematic circuit diagram of an embodiment of the power supply circuit of the present invention.

An embodiment of the present invention, which avoids the use of expensive high squareness reactor cores, is shown in FIG. 3. As in the circuit of FIG. 1, an inverter 110 includes a direct current supply 111 which drives a primary winding 112 of a transformer $T_2$ through a transistor switch $Q_1$. Transistor $Q_1$ is turned on (becomes conductive) in response to a signal applied to its base electrode on lead 22 from pulse width control 21. Inverter 110 thus operates as a switching inverter, generating a square wave, the pulse width of which is responsive to the pulse width control circuit 21.

On the secondary side of transformer $T_2$, a first output winding $N_1$ developes a voltage whenever transistor $Q_1$ is conducting. This voltage is rectified in rectifier 14 which includes a series diode 16 and a shunt diode 18. The rectified voltage is then passed through a low pass filter 20, which includes a series inductor $L_1$ and a shunt capacitor $C_1$, to remove the A.C. ripple component and apply a direct current output voltage $V_{o1}$ across output terminals 23. The output voltage $V_{o1}$ is applied to pulse width control circuit 21 which compares it to a reference voltage to develop a pulse width control signal in a manner known in the art. This pulse width control signal, as explained above, is connected to the base electrode of transistor $Q_1$ to control the duty cycle of inverter 110 and maintain output voltage $V_{o1}$ at a preset value.

A second output winding $N_2$ of transformer $T_2$ develops a voltage $V_1$ in response to current conducted through primary winding 112. A saturable reactor $L_{s2}$ includes a reactor winding 122 and a saturable reactor core 124. Winding $N_2$ is connected to a rectifier 114, again comprising a series diode 116 and a shunt diode 118, through reactor winding 122. The rectified voltage is then applied through low pass filter 120, which includes series inductor $L_2$ and shunt capacitor $C_2$, to provide a direct current output voltage $V_{o2}$ across output terminals 126.

In accordance with the present invention, a clamping circuit 130 is connected across reactor winding 122 and includes a clamping transistor $Q_2$ and a diode 134. As will be explained below, clamping transistor $Q_2$ is actuated to clamp a short circuit across reactor winding 122 at a desired reset point on the B-H hysteresis characteristic of saturable core 124. The control signal applied to the base electrode of transistor $Q_2$ is obtained from a control circuit 136 and specifically from a comparator 138 of the control circuit. One input of comparator 138 is derived from an auxiliary winding $N_F$ of transformer $T_2$. The voltage appearing across winding $N_F$ includes information on the timing and voltage of the input pulse wave applied through the transformer. Winding $N_F$ typically may be the same winding used for feed-forward compensation (not shown). If no feed forward compensation is provided, the voltage provided by winding $N_F$ might instead be obtained from any other winding, such as windings $N_1$ or $N_2$ of the transformer. The voltage from winding $N_F$ is applied to an integrator 140 including a series resistor R and a shunt capacitor C. The capacitor is shunted by a diode $D_1$, which functions as a baseline clipper to keep the signal $V_3$, which is applied to one input terminal of comparator 138, positive.

Figure 4:
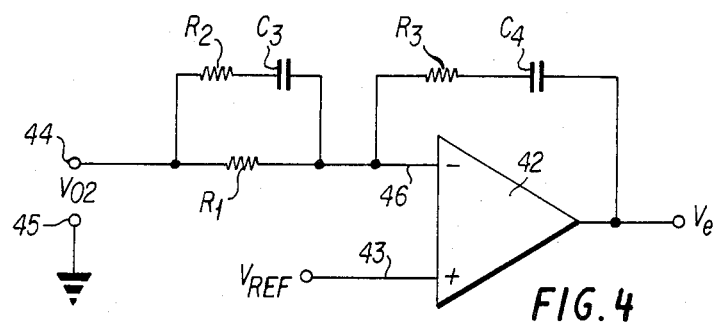
FIG. 4 is a schematic circuit diagram of the error circuit used in the circuit of FIG. 3.

An error circuit, 150, shown in detail in FIG. 4, develops an error signal $V_e$ from output voltage $V_{o2}$ and applies it to the other input terminal of comparator 138. As seen in FIG. 4, error circuit 150 includes a differential amplifier 42. A reference voltage $V_{ref}$ is applied to a first input terminal 43 of amplifier 42. Output voltage $V_{o2}$ is applied across input terminals 44 and 45, the latter of which is grounded. Terminal 44 connects voltage $V_{o2}$ through a series resistor $R_1$ to a second input terminal 46 of differential amplifier 42. Resistor $R_1$ is shunted by a resistor $R_2$ and a capacitor $C_3$ in series, and a resistor $R_3$ and capacitor $C_4$ in series form a feedback circuit for amplifier 42. Impedances $R_1$, $R_2$ and $C_3$ and $R_3$ and $C_4$ are frequency shaping and compensation networks. The reference voltage $V_{ref}$ is preferably selected to be of such magnitude that the error voltage $V_e$ will always be of positive polarity.

Figure 5:
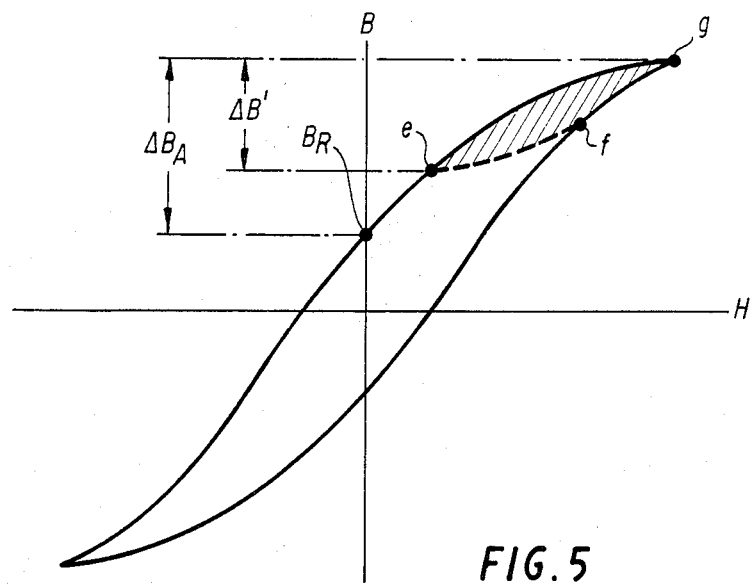
FIG. 5 is a hysteresis characteristic of the core member of the magnetic amplifier used in the circuit of FIG. 3.

Because it is not necessary for the saturable core 124 to have a square hysteresis characteristic, it may be formed of a wide variety of low cost, magnetically soft materials and may be formed in physical shapes which have small gaps. Low remanenent core materials, such as Stackpole 24B or Ferroxcube 3C8 (a ferrite material) may be used. Such materials provide a B-H hysteresis characteristic which is poor in squareness as illustrated by the B-H characteristic shown in FIG. 5. Saturable reactor $L_{s2}$ is thus much less expensive than saturable reactor $L_{s1}$ of the prior art circuit of FIG. 1.

In the operation of the power supply circuit of FIG. 3, saturable core 124 will be at reset point e of the hysteresis loop when transistor $Q_1$ switches on. The core then travels the path e-f-g and saturates. At the end of the pulse, transistor $Q_1$ turns off. The voltage on secondary winding $N_2$ then reverses during the reset period of transformer $T_2$. This reverse voltage brings the core from point g back toward the remanent flux density $B_r$ along the upper branch of the loop. When the core reaches point e, transistor $Q_2$ switches on to clamp a short circuit across reactor winding 122. The current in winding 122 now circulates through transistor $Q_2$ and core 124 stays at reset point e waiting for the next pulse. The magnetic flux density falls an amount designated as $\Delta B'$ in FIG. 5. The available range of adjustment is designed by $\Delta B_A$, the distance between the saturation point g and the remanent flux density $B_R$. Since reset point e is in the same half of the hysteresis characteristic as the saturation point g, the core operates entirely within a single quadrant making it unnecessary to use a forcing current of reverse polarity to reset the core as is required in the prior art circuit of FIG. 1.

Figure 6:
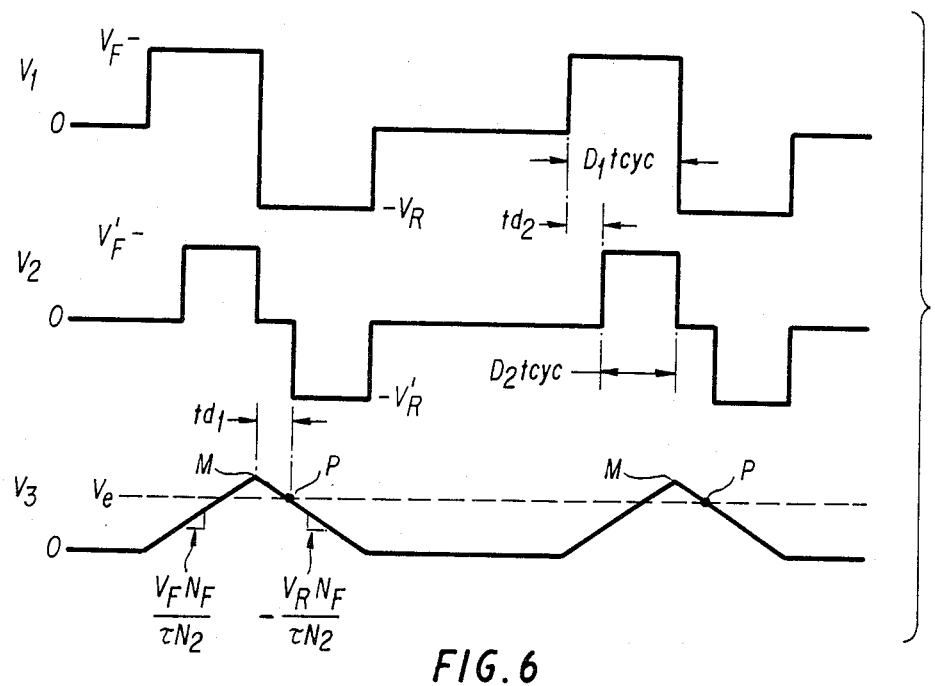
FIG. 6 includes a set of voltage curves illustrating the operation of the circuit of FIG. 3.

The operation of control circuit 136 will be understood from the voltage curves of FIG. 6. The curve $V_1$ represents the voltage $V_1$ from secondary winding $N_2$ as indicated on FIG. 3. From this curve, it is seen that $V_1$ has a positive magnitude $V_F$ during the forward conduction period of winding $N_2$ and a negative magnitude $V_R$ during the recovery period of transformer $T_2$. The voltage magnitudes $V_F$ and $V_R$ are usually, but not necessarily, equal. $V_1$ is held at magnitude $V_F$ for a time $D_1 t_{cyc}$, where $D_1$ represents the duty cycle of the main output voltage $V_{o1}$ and $t_{cyc}$ represents the period of the switching inverter-regulator—that is, the time for one switch cycle of transistor $Q_1$. Thus, $t_{cyc}$ is equal to the inverse of the switching frequency $f_{sw}$.

Curve $V_2$ represents the voltage $V_2$ appearing at the output side of reactor winding 122 and is thus also the input voltage supplied to rectifier 116. Voltage $V_2$ has a magnitude $V'_F$ for a time $D_2 t_{cyc}$, where $D_2$ represents the duty cycle of the auxiliary output voltage $V_{o2}$. The purpose of the control loop is to maintain duty cycle $D_2$ at a value which will keep output voltage $V_{o2}$ at its desired value. The main control is effected by the delay $td_2$, the delay between the onset of the positive pulses of voltage waves $V_1$ and $V_2$. This delays results from the operation of saturable core 124. At the time of the onset of positive pulse $V_F$ of input voltage wave $V_1$, the core is at its reset point e and is not saturated. Winding 122 therefore presents a high impedance to the applied voltage blocking the start of the corresponding positive pulse $V'_F$ of voltage $V_2$ on the output side of the reactor winding. When the core reaches point g on its hysteresis loop, the core saturates and the impedance of reactor winding 122 becomes low permitting the reactor winding to apply the pulse $V'_F$ of voltage wave $V_2$ to the output side of the reactor.

Delay $td_2$ is a direct function of the clamp delay $td_1$ as shown by the relationship:

$$td_2 = td_1 \frac{V_F}{V_R} . \tag{1}$$

Neglecting diode drops, output voltage $V_{o2}$ is given by $$V_{o2} = D_2 V_F = D_1 V_F - \frac{V_R}{t_{cyc}} td_1 . \tag{2}$$

The desired relationship between delay $td_1$ and $V_e$ is obtained by control circuit 136. Resistor R and capacitor C form integrator 140 which provides voltage $V_3$. If this circuit is treated as an ideal integrator, the slopes of the curve for $V_3$ will be as seen in FIG. 6. Diode $D_1$ acts as a baseline clipper to keep the triangular wave signal positive. The generated triangular wave is compared in comparator 138 with error voltage $V_e$. Whenever the triangular wave voltage $V_3$ is less than the error voltage $V_e$, comparator 138 provides a positive output signal on output lead 139. This output signal is applied to the base electrode of clamping transistor $Q_2$ causing transistor $Q_2$ to become conductive. During the forward conduction period $V'_F$, diode 134 is poled to block conduction through clamping circuit 130. However, when the forward conduction period $V'_F$ ends at a time coinciding with the maximum point M of the triangular wave of voltage $V_3$, diode 134 no longer blocks conduction through circuit 130. Thus, when the triangular wave of voltage $V_3$ crosses the value of error voltage $V_e$ at point P, transistor $Q_2$ becomes conductive and clamping circuit 130 applies a short circuit clamp across reactor winding 122. The short circuit current circulates in the loop formed by inductor winding 122, transistor $Q_2$ and diode 134; and core 124 is held at reset point e.

The delay $td_1$ is governed by the equation:

$$td_1 = \frac{V_F D_1 t_{cyc}}{V_R} - V_e \frac{N_2 \tau}{V_R N_F} \quad (3)$$

where $N_2$ and $N_F$ represent the number of turns of windings $N_2$ and $N_F$, respectively, and $\tau$ is the time constant of integrator 40, being equal to the product of the resistance of resistor R and the capacitance of capacitor C. Substituting the expression for $td_1$ given in equation (3) in equation (2) and simplifying, we have:

$$V_{o2} = \frac{N_2}{N_F} \frac{\tau}{t_{cyc}} V_e. \quad (4)$$

It is to be noted from equation (4) that output voltage $V_{o2}$ is now a function of a single variable, the error voltage $V_e$; all of the other parameters of equation (4) are fixed.

As shown in FIG. 6, the rising slope of the triangular wave of voltage $V_3$ is defined by the expression $$\frac{V_F N_F}{\tau N_2}$$

and the declining slope by the expression $$\frac{V_R N_F}{\tau N_2}.$$

In the above analysis, integrator 40 is treated as an ideal integrator. Some error is introduced by the approximate nature of the assumed integrator operation. This error may be held to an acceptable value by keeping $\tau$ equal to or greater than $t_{cyc}$.

When the positive pulse $V_F$ of applied voltage wave $V_1$ ceases, the triangular wave $V_3$ has reached its apex M and the positive pulse $V'_F$ of voltage wave $V_2$ also ceases. Because the fall of positive pulse $V_F$ of applied voltage $V_1$ brings core 124 back from saturation, reactor $L_{s2}$ again presents a high impedance, blocking the negative pulse $V'_R$ of voltage wave $V_2$. When, however, $V_3$ falls below error voltage $V_e$, the clamping transistor $Q_2$ is again actuated causing transistor $Q_2$ to become conductive. Diode 134 does not block the reverse pulse $V'_R$, and the clamp effectively short circuits reactor winding 122. This permits the reverse pulse $V'_R$ to appear at the output side of the reactor.

As the reverse pulse $V_R$ of voltage wave $V_1$ is applied, core 124 is driven along its characteristic from saturation point g toward it remanent point $B_R$. When the core reaches reset point e, triangular wave $V_3$ crosses the value of error voltage $V_e$. Comparator 138 provides an actuating signal on the lead 139 to the base electrode of clamping transistor $Q_2$. Clamping transistor $Q_2$ is therefore actuated, and the short circuit across winding 122 clamps core 124 at reset point e until the next positive pulse $V_F$ is applied as the current in the reactor winding circulates through diode 134 and transistor $Q_2$.

Figure 7:
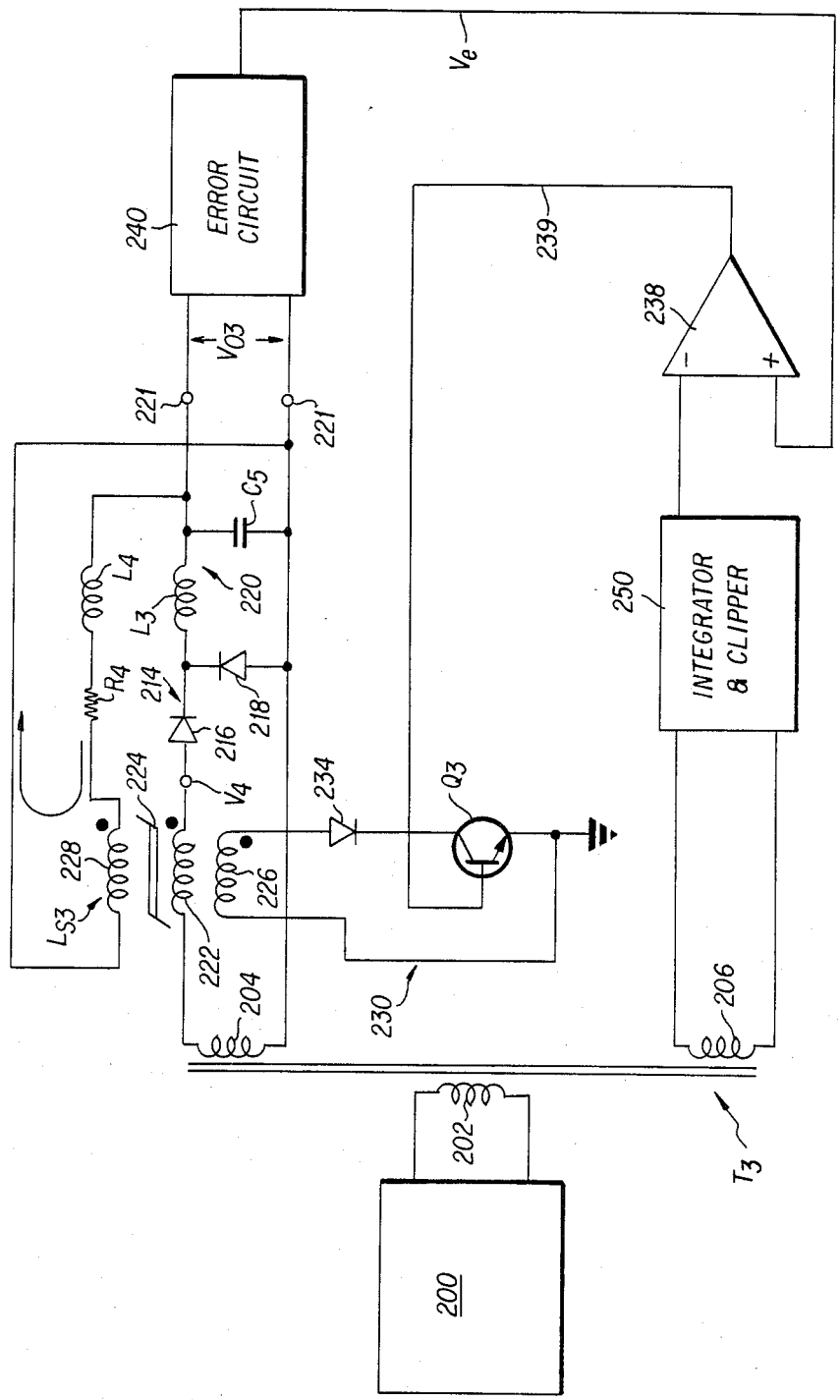
FIG. 7 is a schematic circuit diagram of a second embodiment of a power supply circuit of the present invention.

The embodiment of FIG. 7 incorporates two modifications of the circuit of FIG. 3. First, the clamping circuit is no longer connected directly across the reactor winding, but is, instead, connected across a secondary winding inductively coupled to the reactor winding. Second, the adjustment range of the circuit is increased by providing biasing means to shift the hysteresis characteristic of the core to the right.

As seen in FIG. 7, a self-excited, inverter 200, as shown, for example, in the aforementioned Hiramatsu et al article, generates a square wave to drive primary winding 202 of a transformer $T_3$. It is to be understood, however, that a switching inverter as shown in the prior art circuit of FIG. 1 or the embodiment of FIG. 3 could be used to drive the transformer. A square wave voltage is induced in secondary winding 204 of transformer $T_3$. A saturable reactor $L_{s3}$, which is used to regulate the output voltage $V_{o3}$, includes a reactor winding 222, a reactor core 224, a secondary winding 226 and a bias winding 228. Reactor winding 222 connects secondary winding 204 to a rectifier 214 and a low pass filter 220. Rectifier 214 includes series and shunt diodes 216 and 218, and filter 220 includes series inductor $L_3$ and shunt capacitor $C_5$. Output voltage $V_{o3}$ appears across output terminals 221 on the output side of filter 220. An error circuit 240, which may correspond to the circuit of FIG. 4, develops error voltage $V_e$ and applies it to one input of comparator 238. The other input of comparator 238 is received from an integrator and clipper circuit 250, identical to the ingegrator 140 and diode clipper $D_1$ of the embodiment of FIG. 3. An auxiliary winding 206 on transformer $T_3$ provides a sample of the input voltage from transformer $T_3$ to integrator 250, but this sample could also be taken from across another winding, such as winding 204, of the transformer.

Comparator 238 provides an output signal on lead 239 whenever the magnitude of the triangular wave from integrator and clipper 250 is less than the error voltage $V_e$. This output signal is applied on lead 239 to the base electrode of clamping transistor $Q_3$ of clamping circuit 230 causing the transistor to become conductive. During the positive pulse in winding 204, diode 234 blocks the clamping circuit from applying a short circuit across a reactor secondary winding 226 inductively coupled to reactor winding 222. Diode 234 is poled to permit conduction through transistor $Q_3$ on the reverse wave appearing in winding 204; a short circuit is then clamped across secondary winding 226, effectively clamping a short circuit across reactor winding 222 as a current induced from reactor winding 222 circulates in the loop including winding 226, diode 234 and transistor $Q_3$.

Core 224 of saturable reactor $L_{s3}$ may be identical to the core 124 of the embodiment of FIG. 3. As explained above, the core may be made of magnetically soft material and be formed with small gaps. Such cores are relatively inexpensive and have hysteresis characteristics which are poor in squareness.

Figure 8:
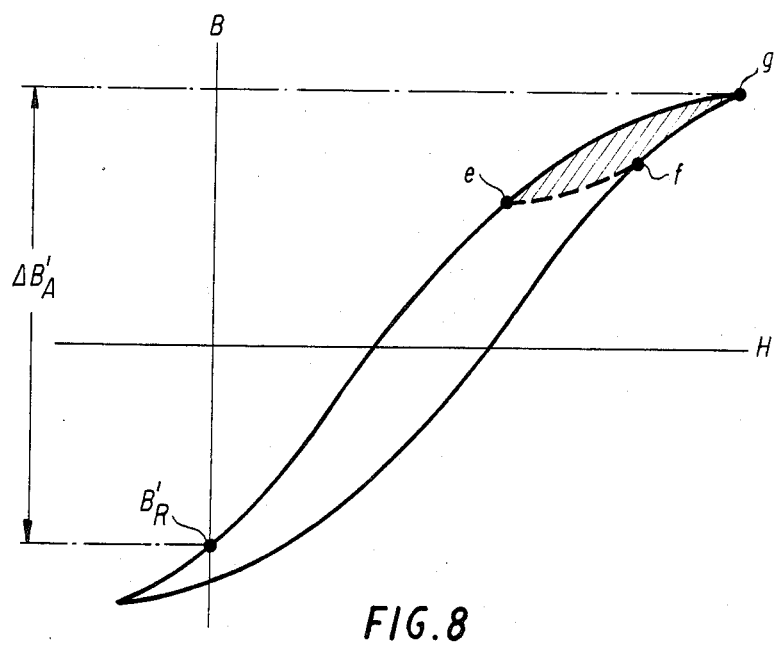
FIG. 8 is a hysteresis characteristic of the core member of the magnetic amplifier used in the circuit of FIG. 7.

As shown in FIG. 8, the effecitve B-H loop of core 224 is shifted to the right to increase the available flux swing. This is accomplished through the use of bias winding 228 connected across output voltage $V_{o3}$ through inductor $L_4$ and resistor $R_4$. Because the reset point e may be adjusted as far as remanent flux density $B'_R$ over an available range of adjustment $\Delta B'_A$ which is much larger than the available range of adjustment $\Delta B_A$ for the embodiment of FIG. 3 (see FIG. 5), the use of bias winding 228 permits a wider range of voltage control.

The circuit of FIG. 7 otherwise operates in the same manner as the circuit as FIG. 3. The output voltage $V_{o3}$ is regulated by adjusting the position of reset point e of the hysteresis characteristic of core 224 in response to the magnitude of error voltage $V_e$. Core 224 is reset during the reverse wave until clamping transistor $Q_3$ becomes conductive. The core is then clamped at its reset point e. The reset point e, in turn, determines the duty cycle of voltage $V_2$ and thus the magnitude of output voltage $V_{o3}$.

It is to be understood that the above described embodiments are shown incorporated in particular power supply systems by way of example and that these applications of the invention should not be considered as limiting the invention. The principles of the invention may be applied to any power supply system incorporating a magnetic amplifier for voltage regulation.

While the invention has been particularly shown and described with reference to preferred embodiments thereof, it will be understood by those skilled in the art that the foregoing and other changes in form and detail may be made therein without departing from the spirit and scope of the invention.

I claim:

1. A power supply circuit comprising:
   a source of alternate positive and negative voltage pulsations;
   a saturable reactor having a reactor winding and a saturable core, said reactor winding being coupled between said source and an output terminal;
   rectifier means poled to couple current through said reactor winding during pulsations of one polarity, said core being driven to saturation during said one of said pulsations; and
   means for resetting said core during pulsations of the other polarity comprising clamping means which, when actuated, holds said core at a reset point on its B-H characteristic, said reset point determining the time of saturation during the next of said one pulsations.

2. A power supply circuit as recited in claim 1, wherein said clamping means comprises switch means connected effectively across said reactor winding to clamp a short circuit across said reactor winding and control means to close said switch means to clamp said core at said reset point.

3. A power supply as recited in claim 2, wherein said switch means comprises a transistor switch.

4. A power supply as recited in claim 2, wherein said switch means and a diode, in series, are connected across said reactor winding, said diode being poled to permit conduction through said switch means during said other of said pulsations.

5. A power supply as recited in claim 2, wherein said switch means is connected across a reactor secondary winding coupled to said reactor winding.

6. A power supply as recited in claim 1, wherein said source is a source of square waves.

7. A power supply as recited in claim 1, wherein said source comprises a transformer having a primary winding and a plurality of secondary windings, one of said secondary windings being connected to said reactor winding and another secondary winding being connected to second rectifier means to provide an output voltage to a second output terminal.

8. A power supply as recited in claim 7, wherein said source is a source of square waves and wherein said second output terminal is coupled to a pulse width modulator generating a control pulse, said control pulse controlling the duty cycle of said source.

9. A power supply circuit comprising:
   a source of positive and negative voltage pulsations;
   a saturable reactor having a reactor winding and a saturable core, said reactor winding being coupled between said source and an output terminal;
   rectifier means poled to couple current through said reactor winding during one of said pulsations, said core being driven to saturation during said one of said pulsations;
   means for resetting said core during the other of said pulsations comprising clamping means which, when actuated, holds said core at a reset point on its B-H characteristic, said reset point determining the time of saturation during the next of said one pulsations; and
   bias means to shift said core B-H characteristic to the right to increase the range of adjustment of said reset point.

10. A power supply as recited in claim 9, wherein said bias means comprises and additional winding coupled to said reactor winding, said additional winding being connected across a source of direct current voltage.

11. A power supply circuit comprising:
    a source of positive and negative voltage pulsations;
    a saturable reactor having a reactor winding and a saturable core, said reactor winding being coupled between said source and an output terminal and said core being formed of a magnetically soft material with a B-H characteristic which is poor in squareness;
    rectifier means poled to couple current through said reactor winding during one of said pulsations, said core being driven to saturation during said one of said pulsations; and
    means for resetting said core during the other of said pulsations comprising clamping means which, when actuated, holds said core at a reset point on its B-H characteristic, said reset point determining the time of saturation during the next of said one pulsations.

12. A power supply circuit comprising:
    a source of positive and negative voltage pulsations;
    a saturable reactor having a reactor winding and a saturable core, said reactor winding being coupled between said source and an output terminal and said core operating entirely within the upper right quadrant of its B-H characteristic;
    rectifier means poled to couple current through said reactor winding during one of said pulsations, said core being driven to saturation during said one of said pulsations; and means for resetting said core during the other of said pulsations comprising clamping means which, when actuated, holds said core at a reset point on its B-H characteristic, said reset point determining the time of saturation during the next of said one pulsations.

13. A power supply circuit comprising:

a source of positive and negative voltage pulsations;

a saturable reactor having a reactor winding and a saturable core, said reactor winding being coupled between said source and an output terminal;

rectifier means poled to couple current through said reactor winding during one of said pulsations, said core being driven to saturation during said one of said pulsations;

means for resetting said core during the other of said pulsations comprising clamping means which, when actuated, holds said core at a reset point on its B-H characteristic, said reset point determining the time of saturation during the next of said one pulsations, said clamping means comprising switch means connected effectively across said reactor winding and control means to select the proper time of actuation of said switch means, said control means comprising an error circuit deriving an error voltage from said output terminal, an integrator circuit integrating a signal derived from said source to provide a wave related to the timing and voltage of said pulsations, and comparator means for developing a control signal for actuating said switch means when said error voltage is greater than the voltage of said wave.

14. A power supply as recited in claim 13, wherein said clamping means further comprises a diode in series with said switch means, said diode being poled to prevent conduction through said switch means during said one pulsation and to permit conduction during said switch means during said other pulsation.

15. A power supply as recited in claim 13, wherein said source comprises a transformer, said signal derived from said source being taken from a winding of said transformer.

16. A power supply as recited in claim 13, wherein said wave is a triangular wave.

17. A power supply as recited in claim 13, wherein said control means further comprises a baseline clipper to keep the wave positive.

18. A power supply as recited in claim 13, wherein said error circuit comprises a differential amplifier having a first input coupled to said output terminal and a second input connected to a source of reference voltage.

* * * * *